Figure 3:
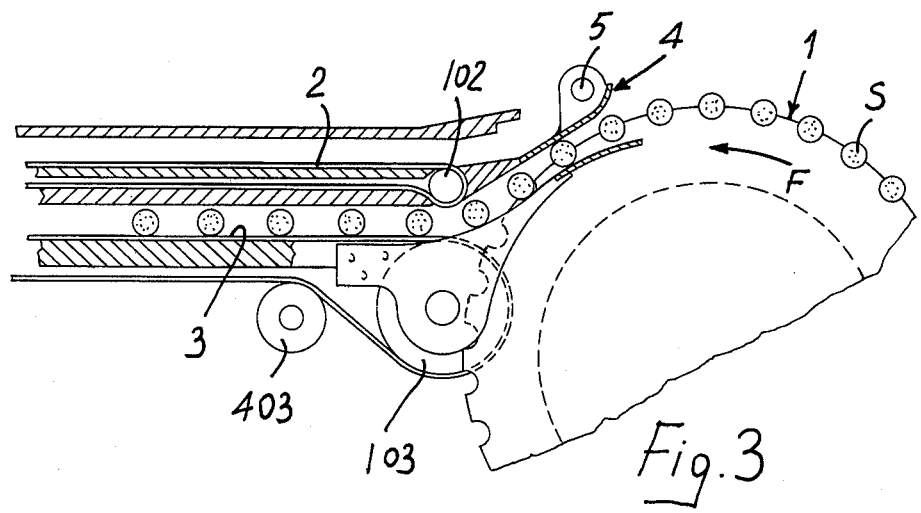

United States Patent [19]

Venturi

[11] 4,083,460
[45] Apr. 11, 1978

[54] METHOD AND DEVICE FOR FORMING GROUPS OF RODLIKE ARTICLES

[76] Inventor: Romano Venturi, Via Bergamini, 4, Bologna, Italy

[21] Appl. No.: 511,154

[22] Filed: Oct. 2, 1974

Related U.S. Application Data

[63] Continuation of Ser. No. 341,478, Mar. 15, 1973, abandoned.

[30] Foreign Application Priority Data

Apr. 13, 1972  Italy .................................. 12601 A/72

[51] Int. Cl.² ............................................. B65G 57/18
[52] U.S. Cl. ...................................... 214/6 H; 53/150; 214/6 F
[58] Field of Search ............. 214/6 H, 6 M, 6 N, 6 F, 214/6.5, 6 DS; 53/148, 150, 160, 161, 162, 164, 236; 198/31 AC, 20 C; 271/64

[56] References Cited

U.S. PATENT DOCUMENTS

| | | | |
|---|---|---|---|
| 1,606,834 | 11/1926 | Halank | 53/148 |
| 2,540,972 | 2/1951 | Wagner, Jr. et al. | 271/64 X |
| 2,697,506 | 12/1954 | Snyder | 198/35 |
| 2,815,949 | 12/1957 | Faeber | 271/64 |
| 3,262,243 | 7/1966 | Molins | 53/150 |
| 3,340,672 | 9/1967 | Kayser | 53/164 |
| 3,388,815 | 6/1968 | Lingl | 214/6 F |

FOREIGN PATENT DOCUMENTS

166,599   1/1964   U.S.S.R. .............................. 214/6 H

*Primary Examiner*—L. J. Paperner
*Attorney, Agent, or Firm*—Spencer & Kaye

[57] ABSTRACT

Apparatus for stacking rows of rodlike articles in a tray from a continuous orderly flow of such articles comprising a continuous infeed conveyor providing such articles, a plurality of receiving stations each including an elongated continuous belt type conveyor receiving a predetermined number of such articles and forming an orderly row therefrom, pivotal means positionable to direct articles from the infeed conveyor to each station, and means for transferring a row of said articles axially from each receiving station to the tray while the directing means is providing articles to another receiving station.

2 Claims, 3 Drawing Figures

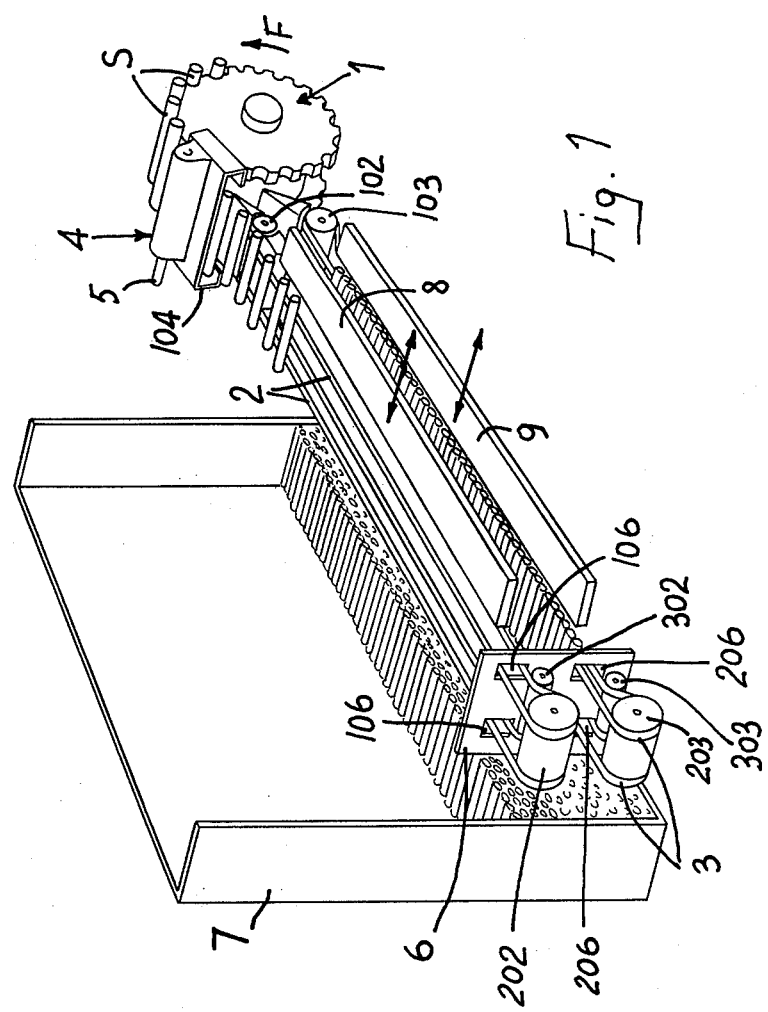

METHOD AND DEVICE FOR FORMING GROUPS OF RODLIKE ARTICLES

This is a continuation of application Ser. No. 341,478 filed Mar. 15, 1973, now abandoned.

The present invention relates to devices which automatically collect rodlike articles, such as cigarettes originating from a cigarette maker, which must be collected in numbered rows and introduced in an orderly manner into appropriate modular containers, called trays.

Collecting devices generally of the above type are not new. These devices normally include an endless conveyor which feed cigarettes aligned side by side in an orderly manner to a collecting station where collecting means form in succession orderly groups of cigarettes each consisting of a pre-set number of cigarettes. Means are provided for transferring in an orderly manner each group of cigarettes into a tray and means is provided to stop the flow of cigarettes at the collecting station during the interval of time when the said group is transferred from the collection station into the tray and while the tray is lowered one step after such a group of cigarettes is introduced into the tray. However, stopping of the flow of cigarettes at the collection station and during introduction of a group of cigarettes into the tray is an inconvenience because it involves a waiting time resulting in idle time for the collecting means. Therefore, such devices cannot be used at the maximum of their working capacity resulting in a relatively small number of cigarettes which can be collected in any unit of time.

The present invention is aimed at obviating the foregoing and for this purpose proposes an improved means for collecting in orderly groups and for stacking into trays. The cigarettes coming from a continuous and orderly flow of cigarettes aligned side by side along a feeding path. Cigarette collection in groups is effected alternatively in at least two separate collecting stations, to each of which is deflected from time to time the continuous flow of cigarettes so that a group of cigarettes is formed at one station while an already formed group of cigarettes at the other station is transferred into a tray. Accordingly, it is not necessary to interrupt the continuous flow of cigarettes to the collection stations during each transfer operation.

The foregoing and other objects and advantages will appear more fully hereinafter from a consideration of the detailed description which follows, taken together with the accompanying drawing wherein one embodiment of the invention is illustrated by way of example. It is to be expressly understood, however, that the drawing is for illustration purposes only and is not to be construed as defining the limits of the invention.

Figure 2:
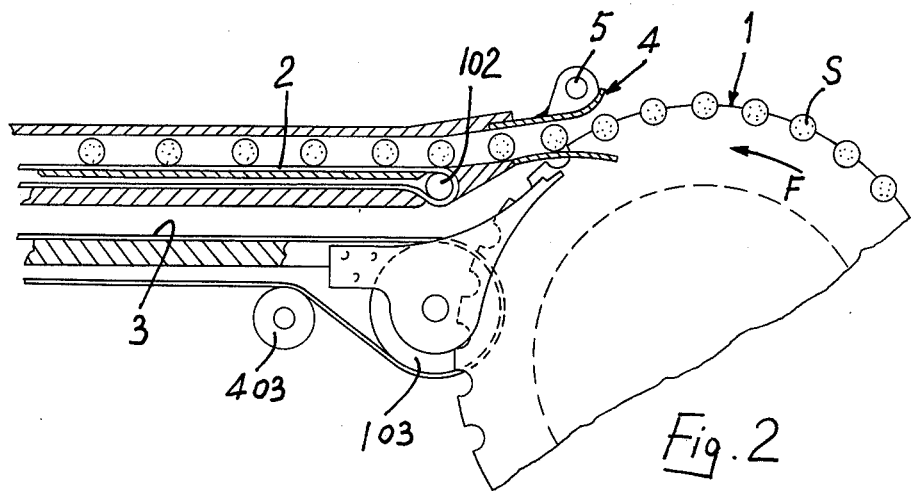

FIG. 1 is a perspective view of a device made in accordance with the invention, and FIGS. 2 and 3 are enlarged side elevational view of the infeed end of the device of FIG. 1 in different working positions.

Referring now to the drawings, a continuous flow of cigarettes S which advance in side by side alignment is provided by a suitable movable support. In this instance, a fluted drum 1 is caused to rotate around its own axis, in the direction indicated by arrow F, for this purpose. This drum is operatively coordinated, in an alternative manner, with at least two additional movable supports formed by two pairs of belts 2 and 3 which are driven along closed circuits on respective rollers 102, 202, 302 and 103, 203, 303, 403.

The pairs of belts 2 and 3 are superimposed one above the other and are operatively coordinated with the drum 1 to alternatively receive the cigarettes S from the flutes of the drum according to the position of a deflector 4. The deflector 4 consists of a short rectangular section duct 104 provided with a shaft 5 and through which the cigarettes S are directed either to the upper belts 2 when in the position shown in FIG. 2 or to the lower belts 3 when in the position shown in FIG. 3. The deflector 4 can be either fixed to or rotatable on the shaft 5. When the deflector 4 is fixed on the shaft 5 suitable motor or drive means (not shown), well known in the art, for shifting the deflector from one of its positions to the other is connected to the shaft. On the other hand, such motor means would be connected to a deflector 4 which was rotatably mounted on the shaft 5.

When deflector 4 is oriented upwardly as shown in FIG. 2, cigarettes S disposed in the flutes of drum 1 move through the duct 104 onto the upper belts 2, and they move onto the lower belts 3 when deflector 4 is oriented downwardly as shown in FIG. 3. The means (not shown) which causes the motor means to shift the deflector 4 from one position to the other is related to the transfer of a pre-set number of cigarettes S from the drum 1 to either of the pairs of belts, respectively. Obviously, the time required by deflector 4 to shift from one to the other of its positions, will have to be less than the time corresponding to a one-step rotation of drum 1.

The pairs of belts 2 and 3 pass through respective pairs of slots 106 and 206 of a slotted plate 6 which acts as a limit or stop and holds the cigarettes S axially aligned on said pairs of belts in opposition to the uninterrupted motion of said belts.

Located at the side of the pairs of belts 2 and 3 which are arranged and operate as already described, is a tray 7 with an open side facing the belts. Tray 7 has a predetermined width to accomodate rows of cigarettes S aligned side by side and consisting of the pre-set number of cigarettes for which the shifting means for the deflector 4 is pre-arranged. Thus, in normal operation, during the time a row of cigarettes S is formed on one of the said pairs of belts, a row already formed on the other pair of belts will be transferred into the tray 7 without interrupting the flow of cigarettes S by the drum 1. This transfer can be accomplished with pusher elements 8 and 9 associated, respectively, with the pairs of belts 2 and 3, and opportunely driven in synchronism with the operative cycle of the whole unit. Alternatively, there could be provided a single pusher (not shown) which would be alternately positioned from time to time relative to each pair of belts supporting a row of cigarettes S to be transferred into the tray 7. Associated to tray 7 will be suitable positioning means, connected functionally with the operating of the complete unit cycle, to move the tray on the basis of the tray filling level and of the pair of belts 2 and 3 from which the transfer of a row of cigarettes will have to be made from time to time.

It should be noted that the cigarettes S move in a lateral direction when they are conveyed by the fluted drum 1 and the pairs of belts 2 and 3. The cigarettes S also move laterally through the duct 104 of the deflector 4, but move axially when transferred from the pairs of belts 2 and 3 into the tray or storage means 7.

Although but a single embodiment of the invention has been illustrated and described in detail, it is to be expressly understood that the invention is not limited thereto. Various changes may also be made in the design and arrangement of the parts without departing from the spirit and scope of the invention as the same will now be understood by those skilled in the art.

I claim:

1. Apparatus for stacking rows of rodlike articles in a tray from a continuous orderly flow of such articles, comprising:

a continuously moving conveyor providing a continuous and orderly flow of rodlike articles aligned side by side and advancing laterally along a feed path;

at least two collection stations each including a continuously moving conveying means for moving rodlike articles in a lateral direction and for collecting a row of such rodlike articles of a predetermined number;

article directing means including a rectangular channel being of sufficient size for passing rodlike articles therethrough and having an open end adjacent said conveyor providing the continuous orderly flow of rodlike articles along a feed path and another open end adjacent said stations;

said article directing means being pivotally mounted and movable between two positions whereby said other open end of said channel is disposed adjacent the conveying means of a different one of said collection stations in each of said positions for alternately directing a predetermined number of rodlike articles from said conveyor first to the conveying means of one of said collection stations and then to the conveying means of the other of said collection stations;

each of said conveying means comprising an elongated endless belt type conveyor having one end adjacent said article directing means and a straight upper run receiving and collecting rodlike articles, and a stop means for each belt type conveyor adjacent its end opposite from said article directing means limiting lateral movement of the rodlike articles disposed on the upper run of the associated belt type conveyor;

a tray having an open side adjacent said collection stations; and means for transferring a row of rodlike articles from each collection station while rodlike articles are being directed to the other of said collection stations, said transferring means axially moving the articles of the row being transferred.

2. Apparatus in accordance with claim 1, and each belt type conveyor comprising a pair of spaced parallel belts.

* * * * *